United States Patent
Takashimizu

[19]

[11] Patent Number: 6,002,892
[45] Date of Patent: Dec. 14, 1999

[54] IMAGE READING APPARATUS WITH SPECULAR REFLECTION BACKING MEMBER ARRANGED TO PREVENT READING OF AN UNWANTED IMAGE ON A REVERSE SIDE OF A THIN ORIGINAL

[75] Inventor: Yoshihiro Takashimizu, Kawasaki, Japan

[73] Assignee: Fujitsu Limited, Kawasaki, Japan

[21] Appl. No.: 09/030,019

[22] Filed: Feb. 25, 1998

[30] Foreign Application Priority Data

Sep. 30, 1997 [JP] Japan .................................. 9-267218

[51] Int. Cl.$^6$ .............................................. G03G 15/043
[52] U.S. Cl. ........................ 399/52; 358/516; 399/374
[58] Field of Search .................................. 399/7, 32, 51, 399/52, 118, 117, 374, 377, 379–380; 358/516, 529

[56] References Cited

U.S. PATENT DOCUMENTS

| | | | |
|---|---|---|---|
| 5,038,182 | 8/1991 | Tanimoto | 399/374 |
| 5,634,173 | 5/1997 | Kamei | 399/52 |
| 5,754,921 | 5/1998 | Imaizumi et al. | 399/52 |

FOREIGN PATENT DOCUMENTS

| | | |
|---|---|---|
| 60-74765 | 4/1985 | Japan . |
| 63-102452 | 5/1988 | Japan . |
| 4-196669 | 7/1992 | Japan . |

*Primary Examiner*—Sandra Brase
*Assistant Examiner*—Quana Grainger
*Attorney, Agent, or Firm*—Armstrong, Westerman, Hattori, McLeland & Naughton

[57] ABSTRACT

An image reading apparatus including a backing member arranged on the original transport path, a light source for emitting the light toward the original reading position in the original transport path in the direction of a predetermined incident optical axis, a detector capable of detecting the light reflected at the original reading position in the direction of a predetermined reading optical axis, and an image processing apparatus. The reflection surface of the backing member is configured in such a manner that the amount of the light reflected by the backing member and detected by the detector is not less than the amount of the light corresponding to a white reference value and that the amount of the light passing through the original, reflected by the backing member, re-passing through the original and detected by the detector, is not more than the amount of the light capable of preventing the imaging from the reverse side.

9 Claims, 7 Drawing Sheets

IMAGE READING APPARATUS WITH SPECULAR REFLECTION BACKING MEMBER ARRANGED TO PREVENT READING OF AN UNWANTED IMAGE ON A REVERSE SIDE OF A THIN ORIGINAL

BACKGROUND OF THE INVENTION

1. Field of the Invention

The present invention relates to an image reading apparatus.

2. Description of the Related Art

Conventionally, an image scanner is used as an image reading means in duplicators, facsimiles, OCRs, filing systems, etc. The image scanner includes a light source for emitting light along an incident optical axis toward an original reading position in an original transport path, a detector such as a CCD arranged in such a manner as to detect the light irradiated from the light source and reflected along a reflection optical axis at the original reading position, and an image processing means connected to the detector. Also, a white backing member is arranged in the original transport path.

In recent years, the trend has been toward a thinner original or paper used as a medium. Also, the documents used in offices have more frequently come to be printed on both surfaces thereof. In reading the image on one of the surfaces of a thin original printed on both surfaces thereof, the image printed on the other surface (reverse side) of the original may be seen through the original and detected by the reading apparatus so that the image on the reverse side may be output overlapped on the image on the front surface, resulting in a deteriorated image quality.

The reading of the image on the reverse side of the original is caused by the fact that the light passes through the original, is reflected by the white backing member, returns through the original and is detected by the detector. Consequently, whenever the image on the reverse side of the original is detected from the front surface of the original, the image on the reverse side is comparatively thin.

In view of this, the image on the reverse side can be prevented from being output by correcting the slice level or the Gamma curve for binarizing the image when the output signal of the detector is image-processed and by judging the detection value of the level of a low light amount, corresponding to the image on the reverse side of the original, as white. In the case where the entire image on the original is comparatively thin, however, the thin image on the front surface of the original may also be judged as white, thereby leading to the problem that the required image drops off for a reduced image quality and the image on the front surface which should otherwise be read cannot be read. Especially, the output image of a thin line or a thin character may be greatly affected.

Another possible means for preventing the image on the reverse side of the original from being output is to make the surface of the backing member black. Making the surface of the backing member black reduces the reflectance of the backing member and therefore the amount of the light passing through the original and reflected by the backing member is reduced, so that the image on the reverse side of the original cannot be seen through the original and is not detected by the detector. In the case where the width of the original is smaller than that of the backing member, however, the backing member extends out of the original, thereby posing the problem that a portion of the backing member is read as a black image.

Japanese Unexamined Patent publication No. 60-74765 discloses an image input apparatus in which the reflectance of the backing member is variable. According to this prior art, the backing member is formed of a liquid crystal device or a movable belt having two portions of different reflectances. The apparatus judges whether the reverse side of the original is white or printed. In the case where the reverse side of the original is white, the reflectance of the backing member is increased, while in the case where the reverse side of the original is not white, the reflectance of the backing member is reduced. This backing member, however, is complicated in structure.

Japanese Unexamined Patent publication No. 63-102452 discloses a reading apparatus in which a guide corresponding to the backing member is formed with a slope entered by the light from a light source and in which the light reflected from the slope mostly enters a detector. The light amount entering the detector is increased in order to prevent the backing member portion around the original from being detected as black when the amount of the light incident to the detector is small. This prior art is not intended to prevent the image on the reverse side of the original from being read when reading the image on one of the two printed surfaces of a thin original.

SUMMARY OF THE INVENTION

The object of the present invention is to provide an image reading apparatus in which the image on the reverse side of a thin original having both surfaces thereof printed is prevented from being read when reading the image on one of the surfaces of the original.

An image reading apparatus according to the present invention comprises an original transport means for transporting an original along an original transport path having an original reading position, a backing member arranged in the original transport path, a light source for emitting a light in the direction of a predetermined incident optical axis toward the original reading position in the original transport path, a detector capable of detecting the light reflected at the original reading position in the direction of a predetermined reading optical axis, and an image processing means connected to said detector. The reflection surface of said backing member is so configured that, in the absence of an original, the amount of the light reflected by said backing member and detected by said detector is not less than the amount of the light corresponding to a white reference value and, in the presence of an original, the amount of the light passing through the original, reflected by said backing member, re-passing through said original and detected by said detector is not more than the amount of the light capable of preventing imaging from the reverse side. For preventing imaging from the reverse side, it is desirable to minimize the amount of the light passing through the original and reflected by the backing member. To this end, the reflection surface of the backing member is formed in a color having a small reflectance.

According to this configuration, therefore, in the case where a thin original has both surfaces thereof printed and the image on one of the surfaces is to be read, the image on the reverse side of the original is prevented from being read while at the same time preventing a portion of the backing member around the original from being detected as black.

Together with the above-mentioned configuration, the following features can be employed.

The backing member is configured in such a manner that the amount of the light reflected by the backing member and detected by the detector is greater than the amount of the light reflected by the original travelling on the backing member and detected by the detector and that the reflectance of the light passing through the original and reflected by the backing member is smaller than that of a backing member formed in a white color.

An angle between the reflection surface of the backing member and the incident optical axis is substantially equal to an angle between the reflection surface of the backing member and the reading optical axis, and an angle between the front surface of the original travelling on the backing member and the incident optical axis is different from an angle between the front surface of the original travelling on the backing member and the reading optical axis.

The reflection surface of the backing member is formed as a mirror surface, so that the light irradiated from the light source is totally reflected by the backing member, and the light emitted from the light source is diffuse-reflected by the front surface of the original travelling on the backing member.

The backing member is made of a transparent body, the surface of which has a first surface perpendicular to the incident optical axis and a second surface perpendicular to the reflected optical axis, said reflection surface is formed within the transparent body, and the light emitted from the light source enters the interior of the backing member from the first surface, is reflected by the reflection surface and exits from the second surface.

A shading layer is formed on the first surface and the shading layer includes a slit allowing the light to enter.

The backing member is formed movably and includes first and second reflection surfaces capable of being located selectively in the original transport path, the first reflection surface acting as the first-mentioned reflection surface, and the second reflection surface acting as a white reference reflection surface.

An image reading apparatus for reading an image recorded on an original according to this invention comprises a transport path for transporting the original, a light source for emitting light onto an original travelling on the transport path, a light detector for detecting the light emitted by said light source and reflected by the original, and a backing member arranged in the transport path for reflecting the light entering from the light source. The backing member is arranged diagonally in such a manner that the incident angle of the light entering from the light source is equal to the incident angle of the light entering the optical axis of the light detector and the backing member is formed of a material having such a reflectance that the amount of the light reflected by the backing member in the direction of the optical axis is equal to or greater than the amount of the light reflected by the original in the direction of the optical axis.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
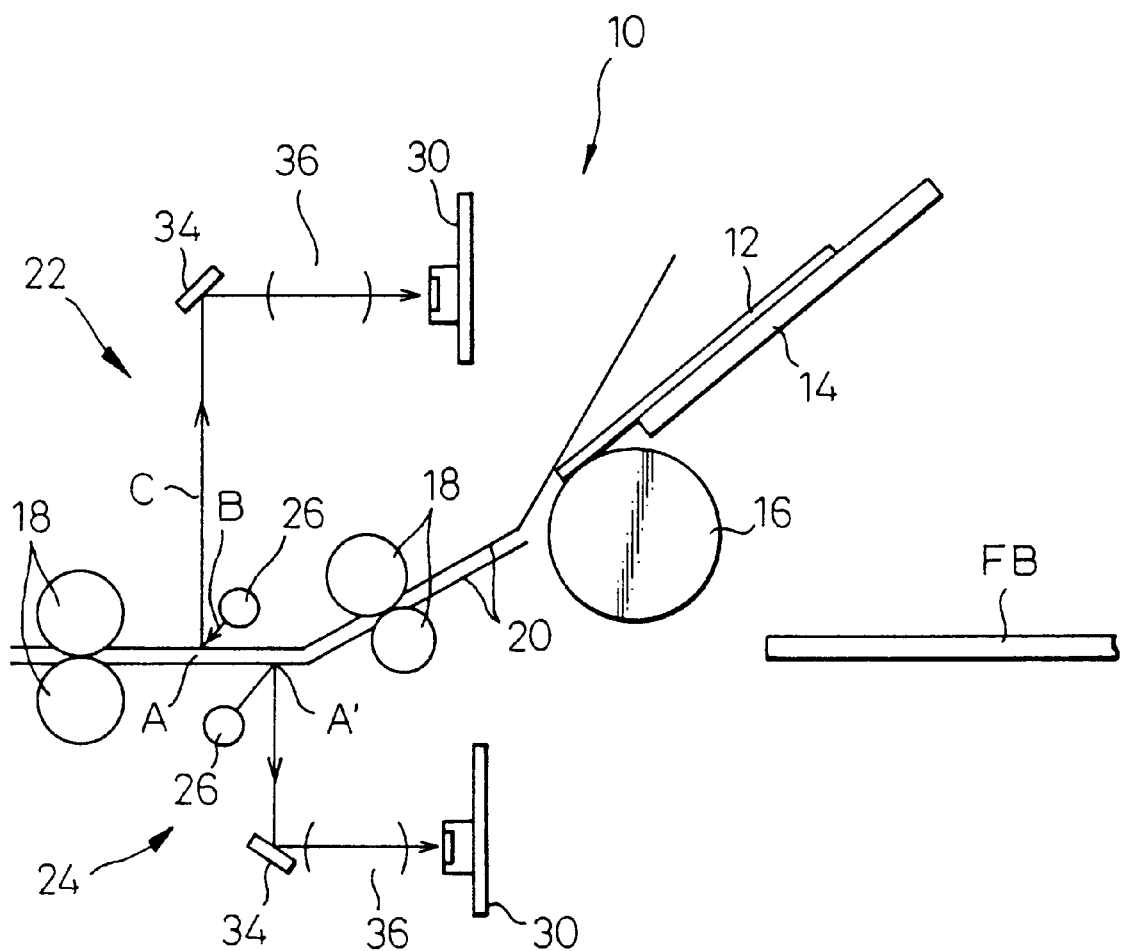
FIG. 1 is a diagrammatic view showing an image reading apparatus according to the embodiment of the present invention.

With reference to FIG. 1, the image reading apparatus 10 according to this invention comprises a hopper 14 on which originals 12 are placed, a pick roller 16, feed rollers 18 and a sheet guide 20. The hopper 14 is capable of receiving a plurality of the originals 12 thereon, and the pick roller 16 picks the originals 12 one by one. In order to prevent a plurality of the originals 12 from being picked at the same time, separating means (not shown) can be provided adjacently to the pick roller 16. The original 12 is transported by the feed rollers 18 along an original transport path defined by the sheet guide 20, and passes through an original reading position A or A' midway of the original transport path. The original reading positions A and A' is located at slightly displaced positions.

The image reading apparatus 10 includes an upper reading unit 22 and a lower reading unit 24. The upper reading unit 22 is arranged above the original transport path for reading the image including prints on the upper surface of the original 12. The lower reading unit 24 is arranged under the original transport path for reading the image including prints on the lower side (reverse surface) of the original 12. Consequently, this image reading apparatus 10 can read the images on both surfaces of the original 12 at the same time. The original reading position A is for the upper reading unit 22, and the original reading position A' is for the lower reading unit 24.

Figure 2:
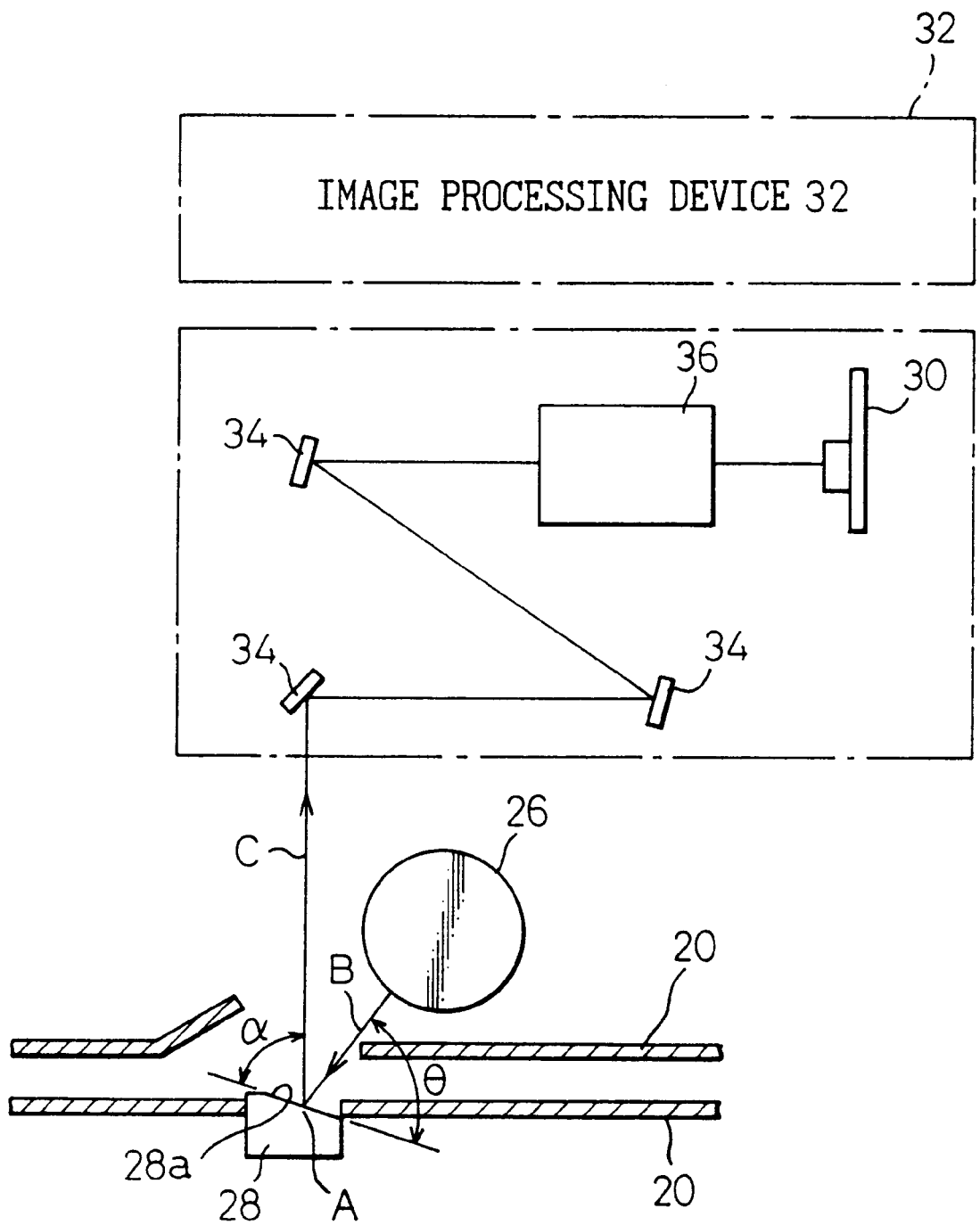
FIG. 2 is an enlarged view showing the upper reading unit in FIG. 1.

FIG. 2 shows the upper reading unit 22. In FIGS. 1 and 2, the upper reading unit 22 includes a light source 26 for emitting a light in the direction of an incident optical axis B toward the original reading position A in the original transport path, a backing member 28 arranged in the original transport path, a detector 30 capable of detecting the light reflected at the original reading position A in the direction of a reading optical axis C, and an image processing means 32 connected to the detector 30. In this case, although the light path from the original reading position A to the detector 30 is formed in a curve by mirrors as described below, the reading optical axis C is set in such a manner that the light that has passed through the reading optical axis C enters the optical axis of the detector 30 along this light path.

A plurality of mirrors 34 are arranged between the backing member 28 and the detector 30 to lead the light reflected at the original reading position A to the detector 30. In FIG.

1, only one mirror 34 is shown, but the number of mirrors is not limited to one. Further, a set of lenses 36 is arranged to focus the light on the detector 30. The detector 30, which is a well-known one such as an image sensor for detecting the light and generating an electrical signal, scans the image on the original 12 in the direction perpendicular to the transportation direction of the original at the original reading position A. The image processing means 32 receives the electrical signal from the detector 30 and converts it into an image signal.

As shown in FIG. 2, the backing member 28 has a reflection surface 28*a* which is arranged diagonally to the original transport path at an angle. The angle between the reflection surface 28*a* of the backing member 28 and the incident optical axis (the optical axis connecting the center of the light source 26 and the reading position A) B is indicated by θ, and the angle between the reflection surface 28*a* of the backing member 28 and the reading optical axis C is indicated by α. The backing member 28 is arranged diagonally to the original transport path in such a manner that the angle θ is substantially equal to the angle α. The reading optical axis C is arranged perpendicular to the original transport path, and the light source 26 is arranged displaced forward or rearward of the reading optical axis C.

The shape and the color of the reflection surface 28*a* of the backing member 28 are configured in such a manner that the amount of the light reflected by the backing member 28 and detected by the detector 30 is not less than the amount of the light corresponding to the white reference value. By doing so, even if the color of the reflection surface 28*a* of the backing member 28 is not white, the portion of the backing member 28 around the original is prevented from being judged as black when the apparatus is in use. The amount of the light reflected by the reflection surface 28*a* of the backing member 28 and detected by the detector 30 is dependent not only on the color of the reflection surface 28*a* but also the other factors such as the angle and the smoothness of the reflection surface 28*a*, for example. This will be described later. Therefore, the reflection surface 28*a* is not necessarily "white" in color. As long as the amount of the light entering the light detector reaches the white reference level, the color of the reflection surface can be gray or other color. This is a problem dependent on the reflectance.

Further, the reflection surface 28*a* of the backing member 28 has such a characteristic that in the presence of an original on the backing member 28, the amount of the light passing through the original 12, reflected by the reflection surface 28*a* of the backing member 28, re-passing through the original 12 and detected by the detector 30 is not more than the amount of the light capable of preventing the imaging from the reverse side. The amount of the light capable of preventing the imaging from the reverse side can be equivalent to the slice level S described later, for example. As an example, the region of the backing member 28 including at least the reflection surface 28*a* is formed of a material having a dark color of gray or black (although a white color is not necessarily excluded) so that the reflectance of the reflection surface 28*a* of the backing member 28 is smaller than the reflectance thereof in the case where the backing member 28 is formed in a white color. As a result, when reading an image on the upper surface of the original 12, even in the presence of an image on the reverse surface of the original 12, there is a reduced possibility that which the light including such an image is reflected by the reflection surface 28*a* of the backing member 28 and reach the detector 30, thus making it possible to prevent the imaging from the reverse side.

The characteristics of the backing member 28 will be described in more detail below.

Figure 3:
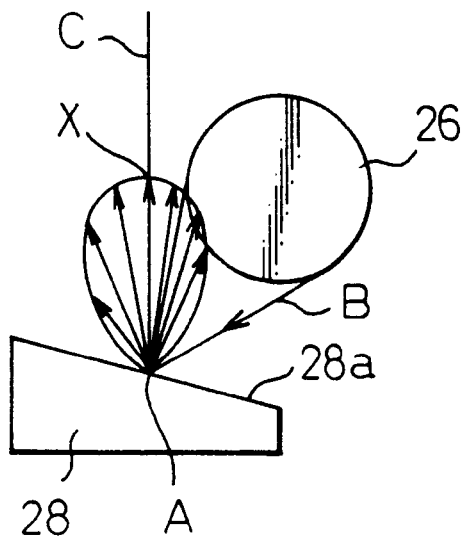
FIG. 3 is a view showing the distribution of the light reflected by the backing member.

FIG. 3 shows the distribution of the light emitted from the light source 26 and reflected by the reflection surface 28*a* of the backing member 28 at the original reading position A. The light source 26 is not a perfect linear light source, and therefore a distribution of the reflected light is obtained, as shown in FIG. 3. In this light distribution, the component of the reflected light passing through the reading optical axis C is a maximum in view of the fact that the backing member 28 is tilted in such a manner that the angle θ is equal to the angle α. The amount of the component of the reflected light passing through the reading optical axis C is indicated by X.

Figure 4:
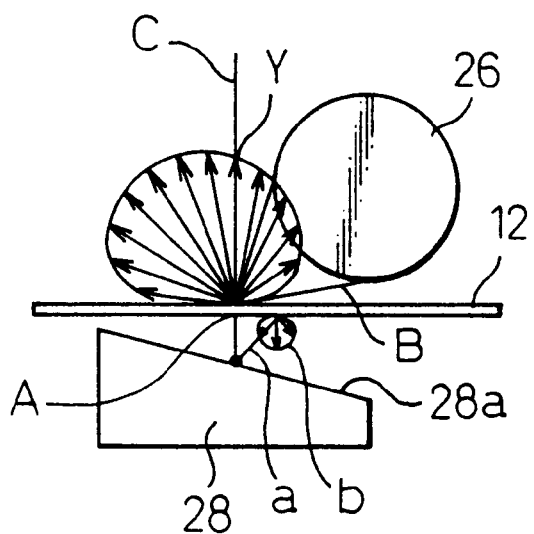
FIG. 4 is a view showing the distribution of the light reflected by the original.

FIG. 4 shows the distribution of the light emitted from the light source 26 and reflected by the white background portion of the original 12 travelling on the backing member 28 at the original reading position A. The angle between the surface of the original 12 travelling on the backing member 28 and the incident optical axis B is different from the angle between the surface of the original 12 travelling on the backing member 28 and the reading optical axis C. With this light distribution, therefore, the component of the reflected light passing through the reading optical axis C fails to be a maximum. The amount of the component of the reflected light passing through the reading optical axis C is designated by Y.

Preferably, the amount of the light X is set to be substantially the same as or slightly greater than the amount of the light Y. Even in the case where the reflection surface 28*a* of the backing member 28 is not actually white in color, the judgement based on the use of the above-mentioned white reference value leads to the judgement of the reflection surface 28*a* of the backing member 28 as white, as long as the amount of the light reflected by the reflection surface of the backing member is greater. Further, if the reflection surface 28*a* of the backing member 28 is formed flat like a mirror surface, the incident light emitting from the light source is reflected substantially totally by the reflection surface. Specular treatment such means as aluminum vapor deposition on the reflection surface 28*a* of the backing member 28 is also effective. In the case where the reflection surface 28*a* of the backing member 28 is formed as a mirror surface, the light emitted from the light source 26 is substantially totally reflected by the reflection surface 28*a* of the backing member 28 so that the amount of the light reflected by the backing member 28 and entering the detector 30 is further increased. On the other hand, the light is diffuse-reflected by the original 12. As shown in FIG. 4, therefore, the amount of the light reflected by the original 12 and entering the detector 30 is comparatively small. In this way, even in the case where the reflection surface 28*a* of the backing member 28 is not perfectly white in color, the amount of the light X can be increased over the amount of the light Y, whereby the portion of the backing member 28 around the original is prevented from being judged as black.

Figure 5:
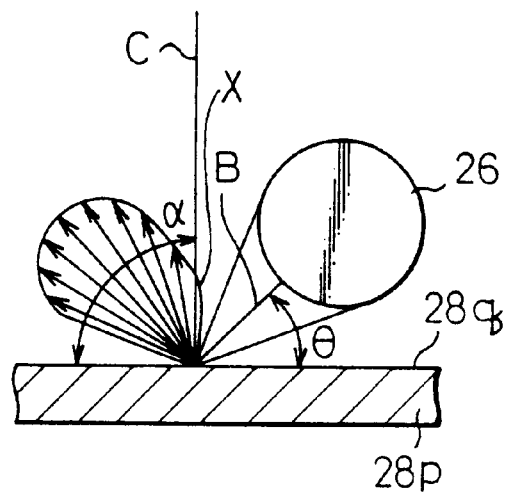
FIG. 5 is a view showing the case in which the incident angle and the reflection angle with respect to the backing member are different from each other.

FIG. 5 shows the distribution of the light reflected by the reflection surface 28*q* of the backing member 28*p* in the case where the angle θ is not equal to the angle α. In this case, the component of the light reflected in the direction of the reading optical axis C is so small that the amount of the light X is not increased. It is therefore difficult to increase the amount of the light X over the amount of the light Y as in the relationship shown in FIGS. 3 and 4. The portion of the backing member outside the original thus appears as a black frame.

Figure 6:
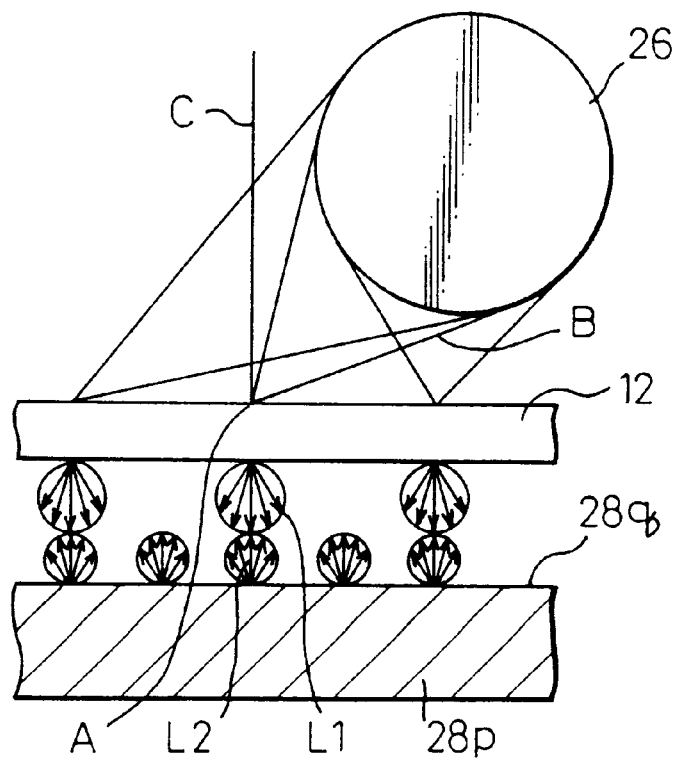
FIG. 6 is a view illustrating the case in which the light passing through the original is reflected by the backing member, re-passing through the original and detected by the detector.

FIG. 6 shows the case in which the image on the reverse surface of the original 12 is detected when reading the image on the upper surface of the original in the prior art. The reading of the image on the reverse surface (imaging from the reverse side) of the original 12 is caused by the fact that the light L1 passing through the original 12 is reflected by the reflection surface 28q of the backing member 28p, and the reflected light L2 passes again through the original 12 and is detected by the detector 30. In this situation, the diffused light passes through the original 12 at many points on the original 12, and the light is diffuse-reflected at many points on the reflection surface 28q. The original 12 and the reflection surface 28q are parallel to each other. Upon reflection of the light from many points on the reflection surface 28q toward the reading position A, the total amount of the light passing through the original 12 in the direction of the reading optical C is increased. The increased amount of the passing through the original 12 in the direction of the reading optical axis C increases the possibility of imaging from the reverse side. By decreasing the amount of the reflected light L2, therefore, the image on the reverse side of the original 12 can be prevented from being detected from the front surface of the original.

FIG. 4 exemplary illustrates the diffused light passing through the original 12, and shows the manner in which part of the diffused light is reflected by the backing member 28 in the direction of the reading optical axis C. As described above, the reflection surface 28a of the backing member 28 is not necessarily formed of a perfectly white material but can be formed of a material having comparatively small reflectance. A small reflectance of the reflection surface 28a of the backing member 28 considerably reduces the amount of the light passing through the original 12 and reflected by the backing member 28 in the direction of the reading optical axis C. Further, in view of the fact that the light is not easily diffuse-reflected by the specular treated reflection surface 28a of the backing member 28, a portion "a" of the light passing through the original 12 and directing toward the reflection surface 28a at a specific angle is reflected by the reflection surface 28a and proceeds in the direction of the reading optical axis C. The light component "b" or the like is not substantially reflected in the direction of the optical axis C. The possibility of the imaging from the reverse side thus is further reduced. By the way, the reflectance of the reflection surface 28a of the backing member 28 is desirably lower for the light having a wavelength component having a higher sensitivity to detection by the detector 30.

In FIG. 1, the lower reading unit 24 is configured similarly to the upper reading unit 22 except that the former is arranged on the opposite side of the original transport path. Specifically, the lower reading unit 24 includes component members similar to those of the upper reading unit 22, i.e., a light source 26, a backing member (not shown) 28, a detector 30 and an image processing means (not shown) 32 connected to the detector 30. Mirrors 34 and lenses 36 are interposed between the backing member 28 and the detector 30. Also, the lower reading unit 24 is movable horizontally in FIG. 1 and can also read an original 12 placed on a flat bed FB.

Figure 7A:
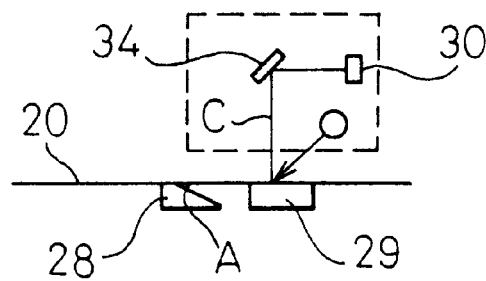
FIG. 7A is a view showing an example of a white level detecting method.
Figure 7B:
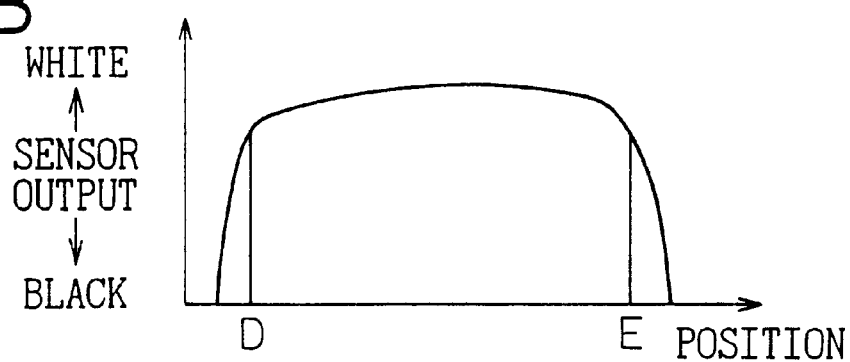
FIGS. 7B to 7D are views showing an example of a detection signal of the detector and image-processed signals.
Figure 7C:
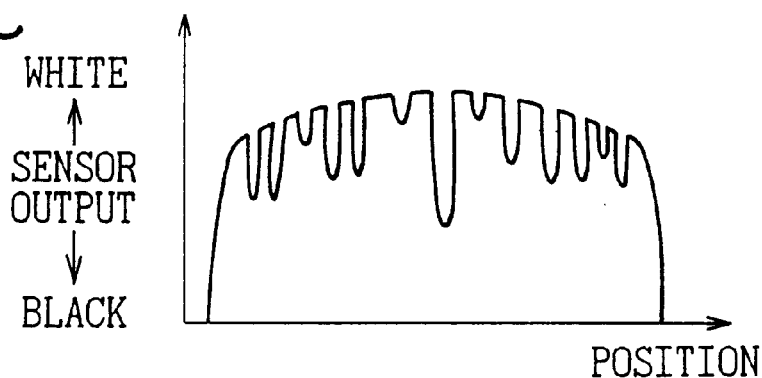
Figure 7D:
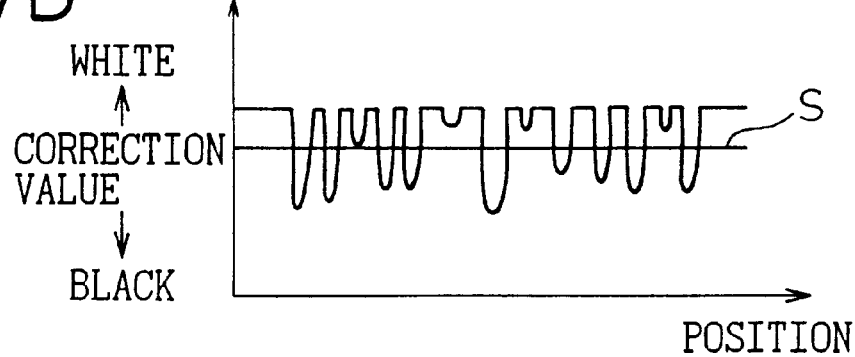

FIGS. 7A to 7D show an example of image processing. FIG. 7A shows a method (system) for detecting the white level. A white reference sheet 29 is arranged in the vicinity of the backing member 28 in the original transport path. The reading unit 22 is moved to the white reference sheet 29, which is then scanned by the detector 30 thereby to detect the white reference level. FIG. 7B shows a form of the output of the detector when the white reference sheet 29 is scanned, which provides a reference level for reading the original constituting a white reference level. The characteristic of FIG. 7B is not flat due to the non-uniformity of the light amount of the light source. The white level is stored in the apparatus. Then, the reading unit 22 is moved to the reading position A, and the original, while being transported along the original transport path, is scanned by the detector 30. FIG. 7C shows an example of the output of the detector 30 when the original is scanned. The output of the detector 30, represents the amount of the light reflected by the original, and indicates that the greater the amount of the light, the whiter the color. The portions dangling from the white level, therefore, indicate the black portions such as characters and lines. FIG. 7D indicates a corrected value obtained by dividing the detection value FIG. 7C by the white level of FIG. 7B. In this process for flattening the density data characteristic (obviating the non-uniformity of the amount of the light of the light source), A-D conversion and D-A conversion are appropriately accomplished. All the data on the white side as viewed from the desired slice level S is considered as white, and the data on the black side as viewed from the slice level S constitute the image data corresponding to the gray level.

Figure 8:
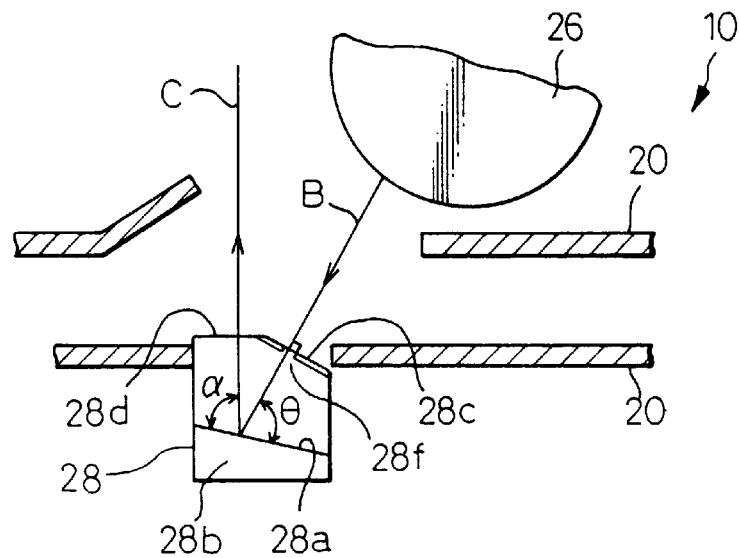
FIG. 8 is a view showing a part of the image reading apparatus according to another embodiment of the invention.
Figure 9:
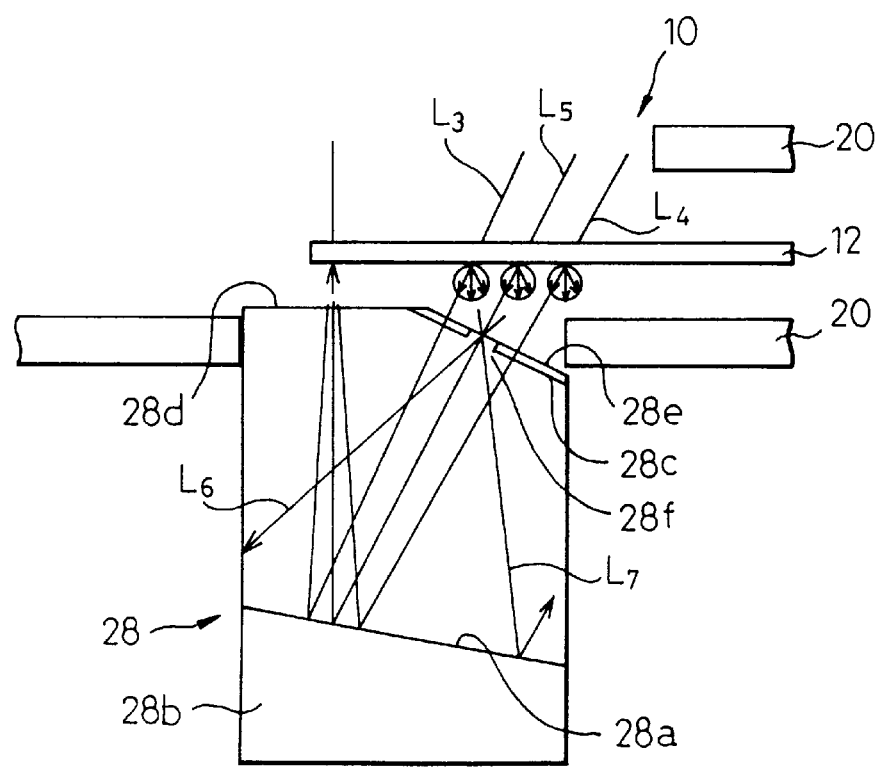
FIG. 9 is a view illustrating the operation of the reading apparatus shown in FIG. 7.

FIGS. 8 and 9 show a part of the image reading apparatus 10 according to another embodiment of the invention. The image reading apparatus 10 is basically formed in a similar manner to the embodiments of FIGS. 1 and 2, except that the configuration of the backing member 28 is changed in this embodiment.

The backing member 28 is made up of a transparent body 28b, and the above-mentioned sloped reflection surface 28a is formed within the transparent body 28b. The surface of the transparent body 28b includes a first surface 28c perpendicular to the above-mentioned incident optical axis B and a second surface 28d perpendicular to the reading optical axis C. The light emitted from the light source 26 enters the interior of the backing member 28 (the transparent body 28b) from the first surface 28c, and exits from the second surface 28d after being reflected by the reflection surface 28a.

By doing so, the first surface 28c is inclined with respect to the original transport path but the inclined portion is short and the second surface 28d extends in parallel to the original transport path to guide the lower surface of the original. Therefore, the chance of the forward end of the original 12 being caught is alleviated when the original 12 passes over the backing member 28. As a result, it is avoided that the original 12 is suddenly displaced and the angle with respect to the reading optical axis C is changed, and that the amount of the light read by the detector 30 is changed. Also, since the first surface 28c is perpendicular to the incident optical axis B, the undesirable reflection of the light from the light source on the surface of the transparent body 28b toward the reading position A can be reduced. Further, the first surface 28c is formed with a shading layer 28e which in turn includes a slit 28f for allowing the light in. This further reduces the reflection on the surface of the transparent body 28b (the shading layer has a low reflectance). The extraneous light, such as L3 and L4, is intercepted by the shading layer and is blocked from entering the slit 28f. Only the light L5 parallel to the incident optical axis B can pass through the slit 28f and is reflected by the reflection surface 28a and proceeds in the direction of the reading optical axis C. As a result, the accuracy of image reading is further improved. Also, most of the light diffused through the original 12 is hampered from reaching the reflection surface 28a, so that the diffused light L6, L7 that has passed through the slit 28f is not: reflected by the reflection surface 28a and does not proceed in the direction of the optical axis C. The undesirable reading of the image on the lower surface of the original 12 is thus further prevented. The transparent body 28b is not necessarily formed integrally, but can be structured in two vertically split upper and lower portions, for example, with the lower portion formed with the reflection surface 28a and the upper portion coupled to the lower portion. The upper portion can be formed of a less glossy optical glass, and the lower portion can be formed of a glass of a dark color such as gray. Also, the transparent body 28b is assumed to be made of a single material and can include the reflection surface 28a at the bottom thereof.

Figure 10:
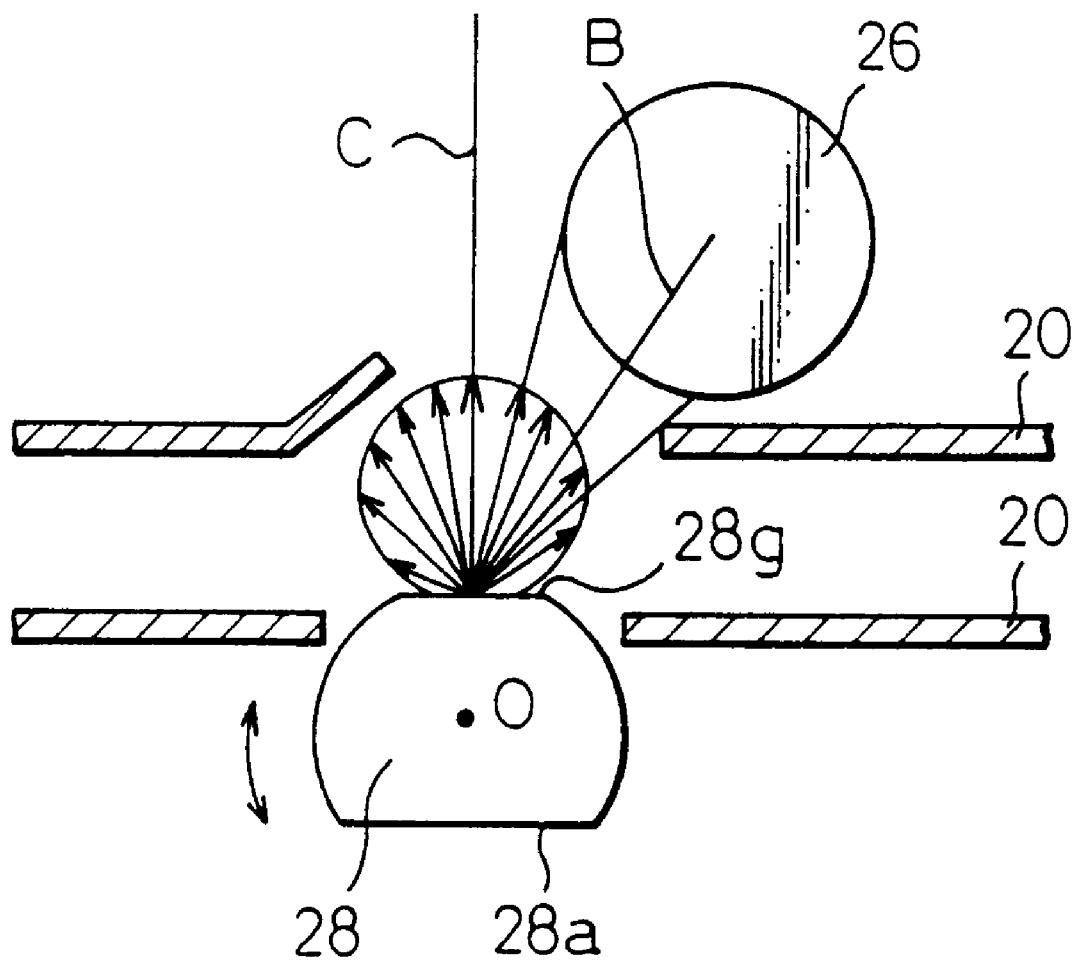
FIG. 10 is a view showing a part of the image reading apparatus according to a further embodiment of the invention.

FIG. 10 shows a portion of the image reading apparatus 10 according to another embodiment of the invention. In this embodiment, the backing member 28 is formed in a such shape that a cylindrical member is cut off along two parallel planes, and includes the reflection surface 28a and another reflection surface 28g. The backing member 28 is formed rotatably about the center O and supported by a bearing not shown. The backing member 28 is rotated by a drive means not shown so that the reflection surface 28a is brought into the diagonal position as shown in FIG. 2 during the reading operation to thereby act as the reflection surface of the backing member 28.

The other reflection surface 28g is formed as a white surface causing the light from the light source 26 to be diffuse-reflected, and can be arranged in parallel to the original transport path as shown in FIG. 10. This reflection surface 28g can be used in place of the white reference sheet 29 shown in FIG. 7A. Specifically, the light diffuse-reflected by the reflection surface 28g is read by the detector 30 to thereby supply a white reference value. As a result, it is possible to perform the reading operation with a high reproducibility of the original 12 with a halftone. Also, in the actual reading operation process, the other reflection surface 28g is not exposed to the original transport path, and therefore, the white reference surface is not worn and paper dust is not collected. In the image reading apparatus having the flat bed FB as shown in FIG. 1, it is possible to provide a white reference section corresponding to the other reflection surface 28g on the reverse side of the flat bed FB.

As described above, according to the present invention, in the case where printed images are formed on both surfaces of a thin original and the image on one of the surfaces of the thin original is read, the image on the reverse side of the original can be prevented from being read, and at the same time, the portion of the backing member around the original can be prevented from being detected as black.

I claim:

1. An image reading apparatus comprising:
   original transport means for transporting an original along an original transport path having an original reading position;
   a backing member arranged in the original transport path;
   a light source for emitting a light in the direction of a predetermined incident optical axis toward the original reading position in the original transport path;
   a detector capable of detecting a light reflected at said original reading position in the direction of a predetermined reading optical axis;
   image processing means connected to said detector,
   wherein a reflection surface of said backing member is so configured that, in the absence of an original, the amount of the light reflected by said backing member and detected by said detector is not less than the amount of the light corresponding to a white reference value and, in the presence of an original, the amount of the light passing through an original, reflected by the backing member, re-passing through the original and detected by said detector is not more than the amount of the light causing imaging from the reverse side of the original, and
   wherein said backing member is fixedly arranged,
   the reflection surface of said backing member is configured such that the ratio of the amount of the light reflected by the reflecting surface and made incident to the detector is maximized,
   and the reflection surface of said backing member has a dark color having such a low reflectance that the amount of the light which passes through the original, is reflected by the reflection surface, re-passes through and made incident to said detector is reduced.

2. An image reading apparatus as defined in claim 1, wherein said backing member is so configured that the amount of the light reflected by said backing member and detected by said detector is greater than the amount of the light reflected by the original traveling on said backing member and detected by said detector and that a reflectance of the light passing through the original and reflected by said backing member is less than a reflectance of the light whenever the backing member is formed in a white color.

3. An image reading apparatus as defined in claim 1, wherein an angle between the reflection surface of said backing member and said incident optical axis is substantially equal to an angle between the reflection surface of said backing member and said reading optical axis and that an angle between the surface of the original traveling on said backing member and said incident optical axis is different from an angle between the surface of the original traveling on said backing member and said reading optical axis.

4. An image apparatus as defined in claim 1, wherein the reflection surface of said backing member is formed as a mirror surface, the light emitted from said light source is totally reflected by said backing member and the light emitted from said light source is diffuse-reflected by the surface of the original traveling on said backing member.

5. An image reading apparatus as defined in claim 1, wherein said backing member is made of a transparent body, the surface of said transparent body having a first surface perpendicular to said incident optical axis and a second surface perpendicular to said reflected optical axis, said reflection surface being formed within said transparent body, so that the light emitted from said light source enters the interior of said backing member from said first surface, is reflected by said reflection surface and exits from said second surface.

6. An image reading apparatus as defined in claim 5, wherein a shading layer is formed on said first surface, said shading layer including a slit for allowing the light to enter.

7. An image reading apparatus as defined in claim 1, wherein said backing member is movably formed and has first and second reflection surfaces capable of being located selectively in the original transport path, said first reflection surface acting as said reflection surface and said second reflection surface acting as said white reference reflecting surface.

8. An image reading apparatus for reading an image recorded on an original, comprising:
   a transport path for transporting an original traveling on said transport path;
   a light detector for detecting the light emitted by said light source and reflected by the original; and
   a backing member arranged in said transport path for reflecting the light made incident from said light source, wherein said backing member is arranged diagonally in such a manner that the incident angle of the light entering from said light source is equal to the incident angle of the light entering the optical axis of said light detector and that said backing member is formed of a material having such a reflectance that the amount of the light reflected by said backing member in the direction of said optical axis is equal to or greater than the amount of the light reflected by said original in the direction of said optical axis.

9. An image reading apparatus for reading an image recorded on an original, comprising:

a transport path for transporting an original through an original reading position;

a light source for emitting a light on an original traveling on said transport path, the light diagonally irradiating the original reading position;

a light detector for detecting the light emitted by said light source and reflected by the original, a reading optical axis for said detector being perpendicular to the original traveling on said transport path; and a backing member arranged in said transport path for reflecting the light made incident from said light source, said backing member providing a white reference, wherein said backing member is arranged diagonally in such a manner that the incident angle of the light entering from said light source is equal to the incident angle of the light entering the optical axis of said light detector.

* * * * *